(12) United States Patent
Borlick et al.

(10) Patent No.: US 10,579,476 B2
(45) Date of Patent: Mar. 3, 2020

(54) USING ALTERNATE RECOVERY ACTIONS FOR INITIAL RECOVERY ACTIONS IN A COMPUTING SYSTEM

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Karl A. Nielsen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 15/618,120

(22) Filed: Jun. 9, 2017

(65) Prior Publication Data
US 2018/0357120 A1 Dec. 13, 2018

(51) Int. Cl.
*G06F 11/14* (2006.01)
(52) U.S. Cl.
CPC ................. *G06F 11/1415* (2013.01)
(58) Field of Classification Search
CPC ... G06F 11/07; G06F 11/0793; G06F 11/0706
USPC .................................................. 714/2
See application file for complete search history.

(56) References Cited

U.S. PATENT DOCUMENTS

| | | | | |
|---|---|---|---|---|
| 6,038,679 A | * | 3/2000 | Hanson | G11B 20/18 714/15 |
| 6,883,126 B1 | * | 4/2005 | Herman | G11B 20/18 714/723 |
| 7,152,178 B1 | * | 12/2006 | Vook | H04L 45/00 714/4.3 |
| 7,945,537 B2 | * | 5/2011 | Balasubramanian | G06F 11/20 707/675 |

(Continued)

OTHER PUBLICATIONS

Seshadri, Sangeetha, et al., "Enhancing Storage System Availability on Multi-Core Architectures with Recovery-Conscious Scheduling," FAST, pp. 143-158, 2008.
(Continued)

*Primary Examiner* — Kamini B Patel
(74) *Attorney, Agent, or Firm* — David W. Victor; Konrad Raynes Davda & Victor LLP

(57) ABSTRACT

Provided are a computer program product, system, and method for using alternate recovery actions for initial recovery actions in a computing system. An initial recovery table provides initial recovery actions to perform for errors detected in the computing system. An alternate recovery table is received including at least one alternate recovery action for at least one of the initial recovery actions. An alternative recovery action provided for an initial recovery action specifies a different recovery path involving at least one of a different action and a different component in the computing system than involved in the initial recovery action. A determination is made as to whether to use the initial recovery action in the initial recovery table for a (Continued)

detected error or the alternate recovery action in the alternate recovery table. The determined initial recovery action or alternate recovery action determined is used to address the detected error.

22 Claims, 5 Drawing Sheets

(56) References Cited

U.S. PATENT DOCUMENTS

| | | | |
|---|---|---|---|
| 8,977,899 B1* | 3/2015 | Schecter | H04L 41/0654 714/26 |
| 9,734,018 B2 | 8/2017 | Kripalani et al. | |
| 2003/0126497 A1* | 7/2003 | Kapulka | G06F 11/0709 714/6.13 |
| 2003/0204768 A1* | 10/2003 | Fee | H04L 1/22 714/4.12 |
| 2005/0204199 A1* | 9/2005 | Harper | G06F 11/079 714/38.11 |
| 2005/0246582 A1* | 11/2005 | Nash | G06F 11/0793 714/12 |
| 2005/0283637 A1* | 12/2005 | Coldicott | G06F 11/1482 714/2 |
| 2009/0292790 A1* | 11/2009 | Salonikios | G06F 16/10 709/217 |
| 2011/0099420 A1* | 4/2011 | MacDonald McAlister | G06F 11/2025 714/6.32 |
| 2012/0144234 A1 | 6/2012 | Clark et al. | |
| 2012/0239822 A1 | 9/2012 | Poulson et al. | |
| 2015/0205661 A1* | 7/2015 | Kaus | G06F 9/38 714/34 |

OTHER PUBLICATIONS

U.S. Appl. No. 16/565,393, filed Sep. 9, 2019, (18.721).
List of IBM Patent and Applications Treated as Related, dated Sep. 32, 2019, pp. 2.

* cited by examiner

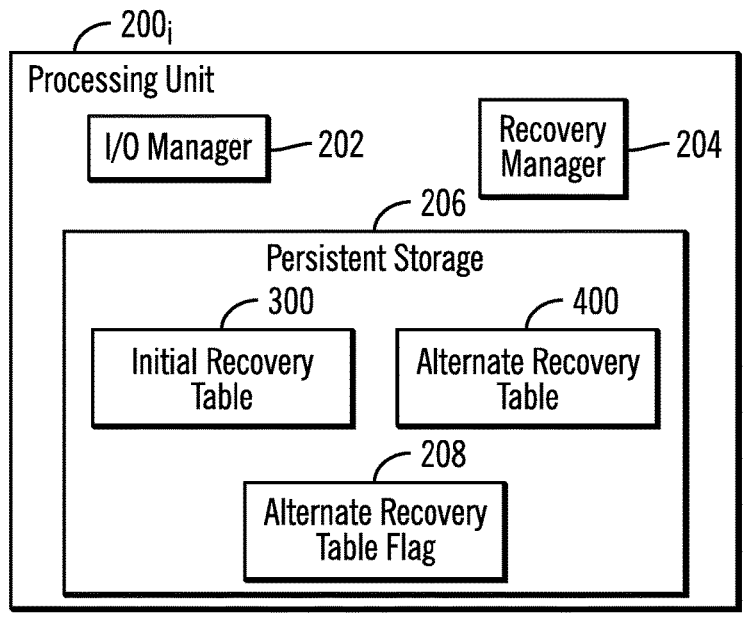

FIG. 2

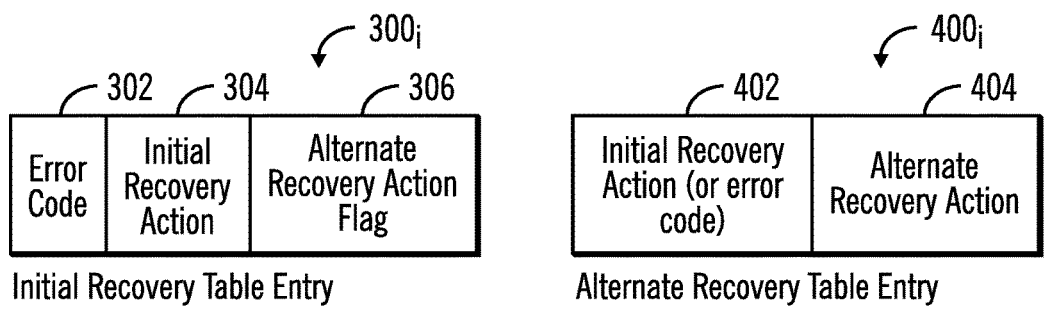

Initial Recovery Table Entry

FIG. 3

Alternate Recovery Table Entry

FIG. 4

| Initial Recovery Action | Alternate Recovery Action |
|---|---|
| Device Adaptor (DA) Failover | Processing Unit Failover |
| Processing Unit Failover | Processing Unit Reboot |
| Device Adaptor (DA) Takeover | Fence Device Adaptor (DA) |
| Warmstart | Processing Unit Failover |
| Quiesce Processing Unit | Processing Unit Failover |
| Shutdown | Reboot |

FIG. 5

USING ALTERNATE RECOVERY ACTIONS FOR INITIAL RECOVERY ACTIONS IN A COMPUTING SYSTEM

BACKGROUND OF THE INVENTION

1. Field of the Invention

The present invention relates to a computer program product, system, and method for using alternate recovery actions for initial recovery actions in a computing system.

2. Description of the Related Art

In a storage environment, a storage system may include redundant processors and components that communicate over multiple Peripheral Component Interconnect Express (PCIe) busses. The storage system may provide recovery actions to implement if an error is detected to avoid use of a path having an error, which may involve a failover, a warmstart, quiescing at the component with the error, reboot, shutdown, etc.

There is a need in the art for improved techniques for handling recovery actions in a computing system.

SUMMARY

Provided are a computer program product, system, and method for using alternate recovery actions for initial recovery actions in a computing system. An initial recovery table provides initial recovery actions to perform for errors detected in the computing system. An alternate recovery table is received including at least one alternate recovery action for at least one of the initial recovery actions. An alternative recovery action provided for an initial recovery action specifies a different recovery path involving at least one of a different action and a different component in the computing system than involved in the initial recovery action. An error is detected in the computing system and a determination is made as to whether to use the initial recovery action in the initial recovery table for the detected error or the alternate recovery action in the alternate recovery table for the initial recovery action. The initial recovery action or alternate recovery action determined to use is used to address the detected error.

BRIEF DESCRIPTION OF THE DRAWINGS

FIG. 2 illustrates an embodiment of components in a processing unit in the storage system.

FIG. 3 illustrates an embodiment of an initial recovery table entry.

FIG. 4 illustrates an embodiment of an alternate recovery table entry.

FIG. 5 illustrates examples of alternate recovery actions provided for initial recovery actions in the storage system.

DETAILED DESCRIPTION

A storage system or other computing system may include redundant processing units and other components to allow for failover in the event there are errors in the paths for one of the processing units. Situations may arise where there are defects or bugs in software implementing initial or default recovery actions provided for the system, that may result in data integrity and/or data loss. Implementation of a recovery action may result in data anomalies that do not exist in the normal operation path, such that implementing a recovery action may introduce such data integrity and/or data loss errors.

Described embodiments provide techniques to allow for alternate recovery actions in a provided alternate action recovery table to use while waiting for a fix to the bugs and defects in the recovery action code to be developed and distributed. Once a code update that fixes the errors in the optimal initial recovery actions is applied in the processing units of the storage system, the system may switch back to using the initial recovery actions, which have been updated and are more optimal than the alternate recovery actions.

Figure 1:
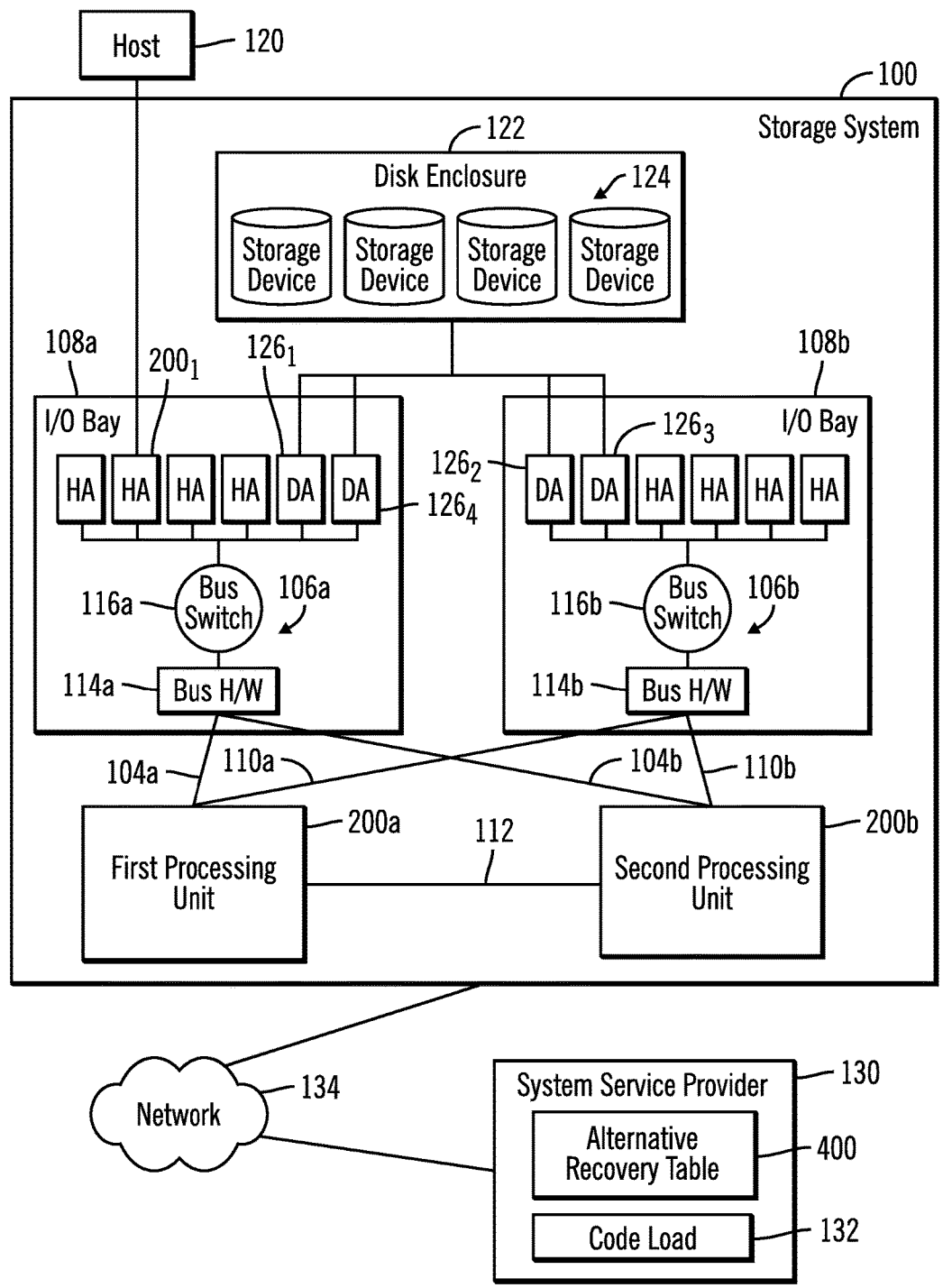
FIG. 1 illustrates an embodiment of a storage system.

FIG. 1 illustrates an embodiment of a storage system 100 including a plurality of independent processing units 200a, 200b, such as a processor complex (CEC), that each have a connection 104a, 104b to a first bus interface 106a, that connects to a first Input/Output (I/O) bay 108a and the device adaptors (DA) and hardware adaptors (HA) therein. Each of the processing units 200a, 200b have a connection 110a, 110b to a second bus interface 106b, that connects to a second Input/Output (I/O) bay 108b. The processing units 200a, 200b may also communicate with each other directory over a link 112, such as a Remote I/O (RIO) loop.

Each bus interface 106a, 106b includes bus hardware 114a, 114b to manage bus operations and log errors, a bus switch 116a, 116b to connect to adaptor endpoints, including host adaptors (HA) and device adaptors (DA) in the I/O bays 108a, 108b. A host 120 connects to the storage system 100 through a host adaptor $200_1$ in the I/O bay 108a.

In one embodiment, the bus interfaces 106a, 106b may comprise a Peripheral Component Interconnect Express (PCIe) bus interface technology, and the bus hardware 114a, 114b may comprise the root complex of the PCIe bus. In alternative embodiments, the bus interfaces 106a, 106b may utilize suitable bus interface technology other than PCIe.

A disk enclosure 122 includes a plurality of storage devices 124 in which logical volumes are configured. Each processing unit 200a, 200b is assigned one of the device adaptors in each of the I/O bays 108a, 108b that connect to the disk enclosure 122 to provide access to data configured in the storage devices 124. Each processing unit 200a, 200b has a default configuration to default communicate with a device adaptor (DA) in one of the I/O bays 108a, 108b, where the default configuration will assign the different processing units 200a, 200b to device adaptors in different of the I/O bays 108a, 108b. For instance, in the default configuration, first processing unit 200a may be default assigned device adaptor $126_1$ in I/O bay 108a and also assigned a redundant device adaptor $126_2$ in the other I/O bay 108a for a failover. The second processing unit 200b may be default assigned device adaptor $126_3$ in I/O bay 108b and also assigned a redundant device adaptor $126_4$ in the other I/O bay 108a for use in a failover.

The storage system 100 may receive an alternate recovery table 400 from a system service provider 130 to deploy at the processing units 200a, 200b. The alternate recovery table 400 (FIG. 4) provides alternate recovery actions for the processing units 200a, 200b to use if data integrity and data loss errors have been found present in the code of initial recovery actions listed in an initial recovery table 300 (FIG. 3). The system service provider 130 may further provide a code load 132 of code to the storage system 100 to deploy at the processing units 200a, 200b to fix update the initial recovery action code used to perform initial recovery actions which were determined to produce data integrity and data loss errors in the system 100.

In one embodiment, the system service provider 130 may provide a code load 132 and the alternate recovery table 400 over a network 134 to the storage system 100. In an alternative embodiment, the code load 132 and alternate recovery table 400 may be provided through other means, such as email, a portable disk drive, e.g., Flash disk, thumb drive, etc.

In the embodiment of FIG. 1, two redundant processing units 200a, 200b, two bus interfaces 106a, 106b and two I/O bays 108a, 108b are shown. In further embodiments, there may be more than the number of shown redundant elements 200a, 200b, 106a, 106b, 108a, 108b, to provide additional redundancy.

The storage system 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

In the embodiment of FIG. 1, the computing system in which described embodiments are performed comprises a storage system. In alternative embodiments, the described embodiments for providing alternate recovery actions may be deployed in other types of computing systems and is not limited to just storage systems.

The storage devices 124 in the disk enclosure 122 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAIVI), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 124 in the disk enclosure 122 may comprise heterogeneous storage devices from different vendors and different types of storage devices, such as a first type of storage devices, e.g., hard disk drives, that have a slower data transfer rate than a second type of storage devices, e.g., SSDs.

FIG. 2 illustrates an embodiment of one of the processing units $200_i$, e.g., 200a, 200b, and includes an I/O manager 202 to manage I/O requests received from connected hosts 120 via a host adaptor (HA), a recovery manager 204 to perform recovery related operations upon detecting an error in the storage system 100, and a persistent storage 206 providing non-volatile memory or storage to store an initial recovery table 300 of initial recovery actions to perform and an alternate recovery table 400, which may be supplied later after deployment of the storage system 100 and received from the system service provider 130. In one embodiment, the persistent storage 206 may include an alternate recovery table flag 208 indicating whether alternate recovery actions in the alternate recovery table 400 should be used instead of the initial recovery actions in the initial recovery table 300.

The initial recovery table 300 may be installed in the persistent storage 206 as part of the initial code load when loading the I/O manager 202 and recovery manager 204 to initialize the processing units 200a, 200b. The initial recovery actions specified in the initial recovery table 300 may comprise optimal recovery methods. The alternate recovery action table 400 may be provided after a determination is made that certain of the initial recovery actions introduce data integrity and data loss errors. The alternate recovery actions specified in the alternate recovery action table 400 to use in lieu of the initial recovery actions may not provide an optimal recovery method, but provide recovery without introducing data integrity and/or data loss errors.

The components, such as the I/O manager 202, recovery manager 204, and other components may be implemented in computer readable program instructions in a computer readable storage medium executed by a processor and/or computer hardware, such as an Application Specific Integrated Circuit (ASIC).

FIG. 3 illustrates an embodiment of an entry $300_i$ in the initial recovery table 300 and includes an error code or error identifier 302 which the processing units 200a, 200b may detect, an initial recovery action 304 to perform to avoid the detected error 302, and optionally an alternate recovery action flag 306 indicating whether to use the initial recovery action 304 or an alternate recovery action specified in the alternate recovery table 400. In an embodiment where the alternate recovery table flag 208 is provided indicating to use the alternate recovery table 400 in lieu of the initial recovery table 300, there may be no alternate recovery action flag 306 in each initial recovery table entry $300_i$. In an embodiment, where each initial recovery table entry $300_i$ includes an alternate recovery action flag 306, there may not be the global alternate recovery table flag 208 in the persistent storage 206.

FIG. 4 illustrates an embodiment of an alternate recovery table entry $400_i$ that indicates an initial recovery action 402 (or alternatively an error code 302) and the corresponding alternate recovery action 404 to perform for the indicated initial recovery action 402, or indicated error code.

The recovery manager 204 may include code to execute each initial 304 and alternate 404 recovery action specified in the entries in the initial recovery table 300 and alternate recovery table 400, respectively.

The initial recovery action 304 may specify one or more actions to perform with respect to one or more components comprising an error recovery path in the storage system 100, such as failover from using one component, such as a device adaptor, processing unit, to a redundant instance of that component. The alternate recovery action 404 may specify a different action and/or component in an alternate recovery path to perform for the detected error 302.

FIG. 5 illustrates examples of initial recovery actions 304 and corresponding alternate recovery actions 404. For instance, if the initial recovery action 304 specifies that the processing unit 200a detecting the error perform a device adaptor (DA) failover, e.g., from a device adaptor (DA) $126_1$ to device adaptor (DA), the alternate recovery action 404 specifies to perform a processing unit failover from the processing unit 200a detecting the error to the other processing unit 200a. If the initial recovery action 304 specifies a processing unit 200a failover for the processing unit 200a detecting the error, the alternate recovery action 404 specifies to reboot the processing unit 200a detecting the error. The initial recovery action 304 may specify a device adaptor takeover, which occurs when one processing unit 200a detects the other processing unit 200b is down, and the surviving processing unit 200a would take over the device adaptor $126_2$ assigned to the failed processing unit 200b. If the initial recovery action 304 specifies a device adaptor takeover for the surviving processing unit 200a, then the alternate action may comprise fencing the device adaptor $126_2$ assigned to the failed processing unit 200b, where the fencing prevents other components from using that device adaptor $126_2$. If the initial recovery action 304 specifies a warmstart for the processing unit 200a detecting the error, then the alternate recovery action 404 may comprise a processing unit failover from the processing unit 200a detecting the error to the other processing unit 200b. If the initial recovery action specifies a quiesce processing unit for the processing unit detecting the error, which may be in the detecting processing unit, where queiscing blocks I/O requests to the processing unit experiencing the error, then the alternate recovery action may comprise a processing unit failover from the processing unit 200a experiencing the error to the other processing unit 200b. If the initial recovery action specifies a shutdown of the processing unit detecting the error, then the alternate recovery action may comprise a reboot of the processing unit 200a experiencing the error.

Other initial recovery actions and alternate recovery actions may be provided. Further, different alternate recovery actions may be provided for the same initial recovery action.

Figure 6:
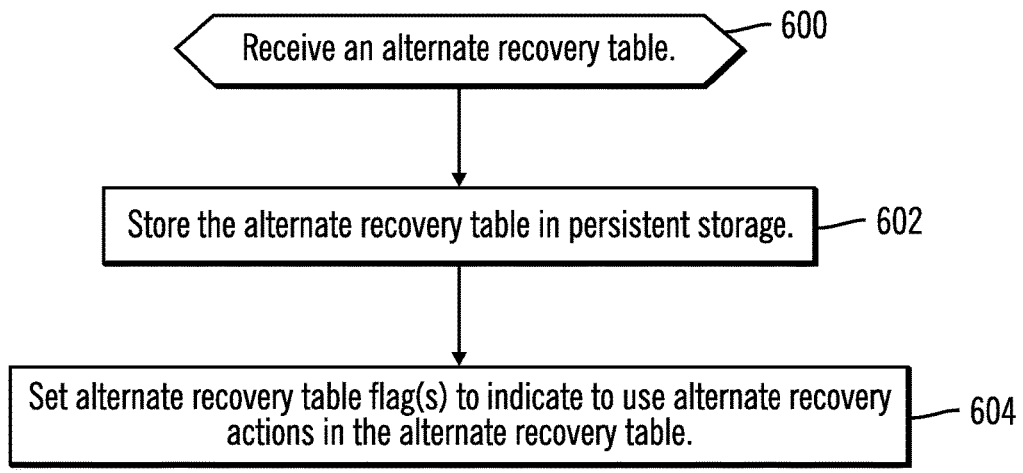
FIG. 6 illustrates an embodiment of operations to receive an alternate recovery table of alternate recovery actions to use.

FIG. 6 illustrates an embodiment of operations performed by the recovery manager 204 in one of the processing units 200a, 200b to receive an alternate recovery table 400. Upon receiving (at block 600) an alternate recovery table 400, such as from the system service provider 130, the recovery manager 204 stores (at block 602) the received alternate recovery table 400 in the persistent storage 206. The recovery manager 204 sets (at block 604) one or more alternate recovery table flag(s) 208 or 306 to indicate to use alternate recovery actions 404 in the alternate recovery table 400 instead of initial recovery actions 304. In an embodiment where a global alternate recovery table flag 208 is provided, the indication to use alternate recovery actions may comprise setting the alternate recovery table flag 208 to use the alternate recovery table 400. In an alternative embodiment, where an alternate recovery action flag 306 is provided in each initial recovery table entry $300_i$, the indication to use the alternate recovery action may comprise setting the alternate recovery action flags 306 for the initial recovery actions 304 for which the alternate recovery actions 404 in the alternate recovery table 400 are provided.

With the embodiment of FIG. 6, the vendor or administrator of the storage system 100, or other computing system, may determine that recovery actions are introducing data integrity and/or data loss errors into the system and provide the alternate recovery table 400 specifying alternate recovery action to use while a code fix to correct the errors in the initial recovery action code in the recovery manager 204 is being developed. In this way, the alternate recovery action table 400 provides an immediate temporary fix of alternate recovery actions, that may not comprise optimal recovery actions, but avoid the data integrity and/or data loss errors experienced with the initial recovery actions.

Figure 7:
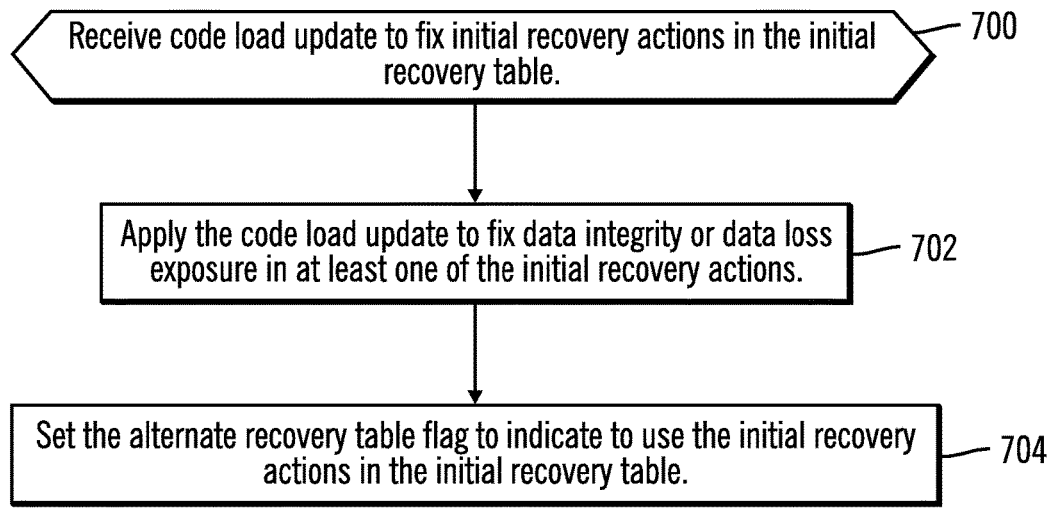
FIG. 7 illustrates an embodiment of operations to perform a code load update to fix errors in initial recovery action code.

FIG. 7 illustrates an embodiment of operations performed by the recovery manager 204 to perform a code load update. Upon receiving (at block 700) a code load 132 to update the initial recovery action 304 code in the recovery manager 204, the recovery manager 204 applies (at block 702) the code load 132 update to fix data integrity and/or data loss exposure in at least one of the initial recovery actions 304 implemented in the recovery manager 204 code. The recovery manager 204 sets (at block 704) one or more alternate recovery table flag(s) 208 or 306 to indicate to use the initial recovery actions 304 in the initial recovery table 300 instead of the alternate recovery actions 404. In an embodiment where a global alternate recovery table flag 208 is provided, the indication to use the initial recovery actions may comprise setting the alternate recovery table flag 208 to use the initial recovery table 300. In an alternative embodiment, where an alternate recovery action flag 306 is provided in each initial recovery table entry $300_i$, the indication to use the initial recovery actions may comprise setting the alternate recovery action flags 306 for the initial recovery actions 304, for which the code load 132 update is provided to fix the initial recovery actions, to indicate to use the corresponding initial recovery action 304.

With the embodiment of FIG. 7, when the code load 132 is developed to fix the error exposure in the initial recovery actions implemented by the recovery manager 204, the code load 132 may be distributed to the storage systems 100. Upon applying the code load at each storage system 100, the recovery managers 204 may indicate to go back to using the initial recovery actions fixed in the code load 132 by setting the alternate recovery flag(s) 208 or 306.

Figure 8:
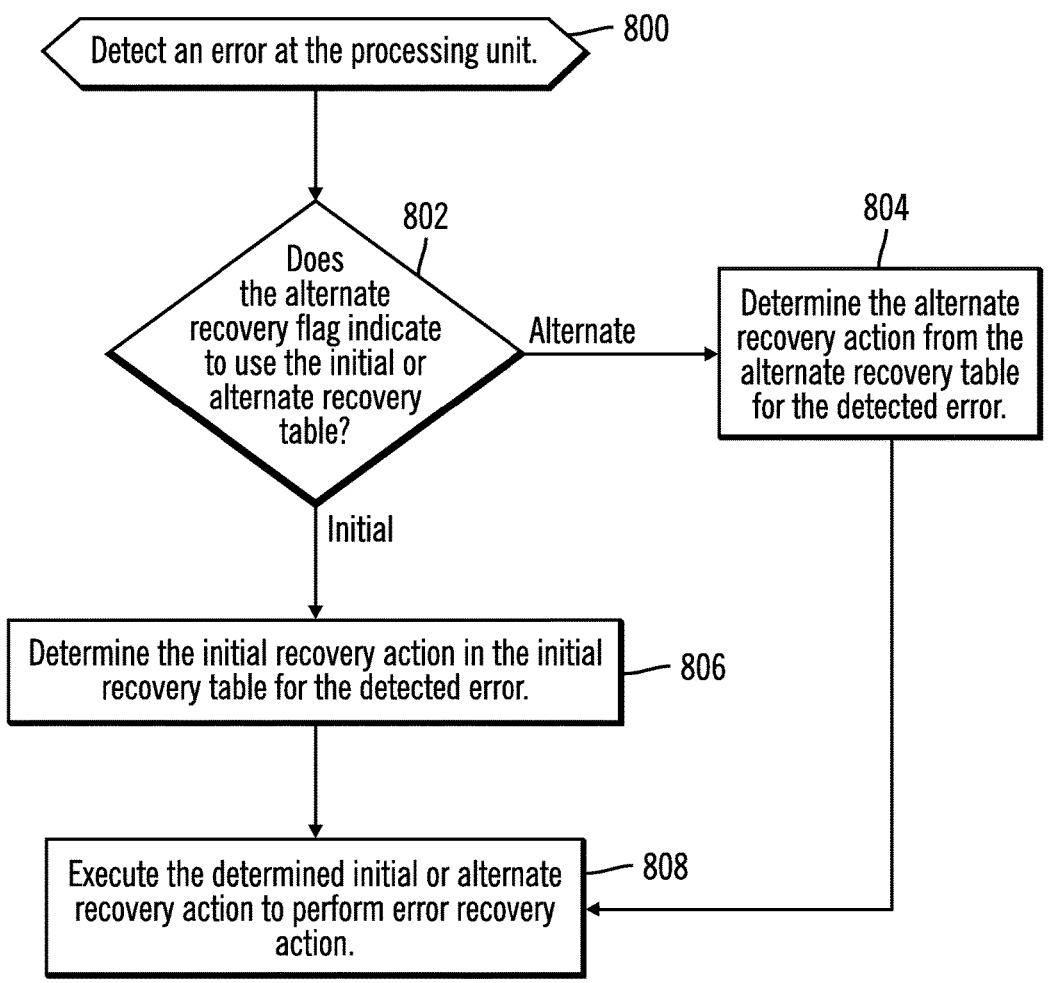
FIG. 8 illustrates an embodiment of operations to perform a recovery action using the initial recovery table or alternate recovery table.

FIG. 8 illustrates an embodiment of operations performed by the recovery manager 204 in the processing units 200a, 200b to use initial or alternate recovery actions when detecting an error. Upon detecting (at block 800) an error at one of the processing units 200a, 200b, a determination is made (at block 802) whether the alternate recovery table flag 208 or 306 (for the specific recovery entry action 304 in the entry $300_i$) indicates whether to use the initial 304 or alternate 404 recovery action for the detected error. If (at block 802) the flag 208 or 306 indicates to use the alternate recovery action, then the alternate recovery action 404 is determined (at block 804) from the alternate recovery table 400 for the initial recovery action/detected error 402. Otherwise, if the flag 208 or 306 indicates to use the initial recovery action, the initial recovery action 304 for the detected error 302 is determined (at block 806). The recovery manager 204 executes (at block 808) the determined initial 304 or alternate 404 recovery action.

With the embodiment of FIG. 8, the recovery manager 204 in the processing unit 200a, 200b detecting the error, which may be within the processing unit 200a, 200b or another component in the system 100, determines whether to use the initial recovery action providing the optimal recovery path or the alternate recovery action, which may not be as optimal as the initial recovery action, to avoid data integrity and/or data loss errors detected with the code implementing the initial recovery action. The temporary alternate recovery actions, which avoid data integrity and/or data loss errors, are provided while fixes to the code in the recovery manager 204 implementing the initial recovery actions are developed and deployed in the storage system 100.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
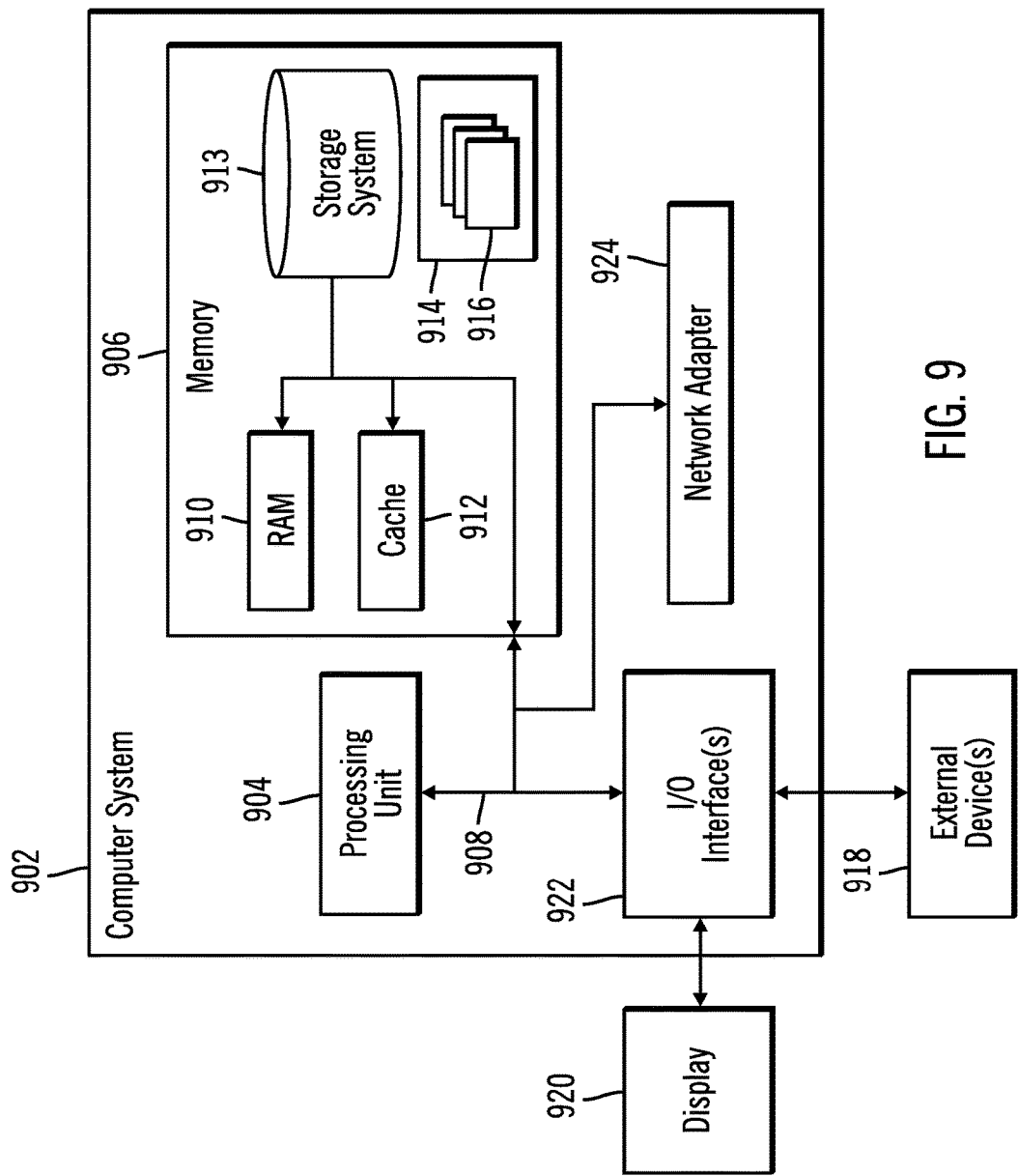
FIG. 9 illustrates an embodiment of a computer architecture used with described embodiments.

The computational components of FIG. 1, including the processing units 200a, 200b, the host 120, and the system service provider 130 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing a recovery action upon detecting an error in a computing system having a persistent storage, the computer program product comprising a computer readable storage medium having computer readable program code embodied therein that is executable to perform operations, the operations comprising:

maintaining an initial recovery table providing initial recovery actions to perform for errors detected in the computing system;

receiving an alternate recovery table including at least one alternate recovery action for at least one of the initial recovery actions, wherein an alternative recovery action provided for an initial recovery action specifies a different recovery path involving at least one of a different action and a different component in the computing system than involved in the initial recovery action, wherein the initial recovery table and the alternate recovery table are stored in the persistent storage to be maintained through a reboot of the computing system;

detecting an error in the computing system;

determining whether to use the initial recovery action in the initial recovery table for the detected error or the alternate recovery action in the alternate recovery table for the initial recovery action; and using the initial recovery action or alternate recovery action determined to use to address the detected error.

2. The computer program product of claim 1, wherein the operations further comprise:

maintaining at least one flag indicating whether to use the initial recovery action in the initial recovery table for the detected error or the alternate recovery action in the alternate recovery table, wherein the determining whether to use the initial or alternate recovery action comprises determining whether the flag indicates to use the initial recovery action or the alternate recovery action.

3. The computer program product of claim 2, wherein the operations further comprise:

setting the flag to use the at least one alternate recovery action in the alternate recovery table to recover from an error in response to receiving the alternate recovery table.

4. The computer program product of claim 2, wherein the at least one flag comprises a plurality of flags, one for each of the initial recovery actions indicating whether to perform the initial recovery action or the alternate recovery action in the alternate recovery table provided for the initial recovery action, wherein the determining whether to use the initial recovery action in the initial recovery table for the detected error or the alternate recovery action in the alternate recovery table for the initial recovery action comprises determining whether the flag for the initial recovery action for detected error indicates to use the initial recovery action or the alternate recovery action.

5. The computer program product of claim 1, wherein each of the at least one alternate recovery action is provided for one of the initial recovery actions when application of the initial recovery action would result in a data integrity or data loss exposure when applied to address the detected error in the computing system.

6. The computer program product of claim 1, wherein the operations further comprise:

receiving a code load to update code for the at least one of the initial recovery actions for which the at least one alternate recovery action is provided in the alternate recovery table, wherein the code load fixes a data integrity or data loss exposure in the at least one of the initial recovery actions; and return to using the at least one of the initial recovery actions to which the code load is applied from using the alternate recovery action for the initial recovery action after applying the code load.

7. The computer program product of claim 1, wherein the computing system includes a first processing unit that accesses a storage through a first device adaptor and a second processing unit that accesses the storage through a second device adaptor, wherein for an error in a path from the first processing unit to the storage, the initial recovery action comprises a failover for the first processing unit to use the second device adaptor and the alternate recovery action comprises a failover from the first processing unit to the second processing unit.

8. The computer program product of claim 1, wherein the computing system includes a first processing unit that accesses a storage through a first device adaptor and a second processing unit that accesses the storage through a second device adaptor, wherein for an error at the first processing unit, the initial recovery action comprises a failover from the first processing unit to the second processing unit and the alternate recovery action comprises a reboot of the first processing unit.

9. A computer program product for performing a recovery action, the computer program product comprising a computer readable storage medium having computer readable program code embodied therein that is executable to perform operations, the operations comprising:

maintaining an initial recovery table providing initial recovery actions to perform for errors detected in a computing system including a first processing unit that accesses a storage through a first device adaptor and a second processing unit that accesses the storage through a second device adaptor;

receiving an alternate recovery table including at least one alternate recovery action for at least one of the initial recovery actions, wherein an alternative recovery action provided for an initial recovery action specifies a different recovery path involving at least one of a different action and a different component in the computing system than involved in the initial recovery action;

detecting an error in a defective processing unit comprising one of the first or second processing unit having an error; and determining whether to use the initial recovery action in the initial recovery table comprising a first action with respect to the defective processing unit or the alternate recovery action in the alternate recovery table comprising a second action different from the first action with respect to the defective processing unit; and using the initial recovery action or alternate recovery action determined to use to address the detected error.

10. The computer program product of claim 9, wherein when the first action comprises a warmstart or a quiescing of I/O for the defective processing unit, the second action comprises a failover from the defective processing unit to another of the first or second processing unit, wherein when the first action comprises a shutdown of the defective processing unit, the second action comprises a reboot of the defective processing unit.

11. A system comprising:
a processor;
a persistent storage;
a computer readable storage medium having computer readable program code embodied therein that when executed by the processor performs operations, the operations comprising:
 maintaining an initial recovery table providing initial recovery actions to perform for errors detected in the system;
 receiving an alternate recovery table including at least one alternate recovery action for at least one of the initial recovery actions, wherein an alternative recovery action provided for an initial recovery action specifies a different recovery path involving at least one of a different action and a different component in the system than involved in the initial recovery action, wherein the initial recovery table and the alternate recovery table are stored in the persistent storage to be maintained through a reboot of the system;
 detecting an error in the computing system;
 determining whether to use the initial recovery action in the initial recovery table for the detected error or the alternate recovery action in the alternate recovery table for the initial recovery action; and
 using the initial recovery action or alternate recovery action determined to use to address the detected error.

12. The system of claim 11, wherein the operations further comprise:
 maintaining at least one flag indicating whether to use the initial recovery action in the initial recovery table for the detected error or the alternate recovery action in the alternate recovery table, wherein the determining whether to use the initial or alternate recovery action comprises determining whether the flag indicates to use the initial recovery action or the alternate recovery action.

13. The system of claim 11, wherein each of the at least one alternate recovery action is provided for one of the initial recovery actions when application of the initial recovery action would result in a data integrity or data loss exposure when applied to address the detected error in the system.

14. The system of claim 11, wherein the operations further comprise:
 receiving a code load to update code for the at least one of the initial recovery actions for which the at least one alternate recovery action is provided in the alternate recovery table, wherein the code load fixes a data integrity or data loss exposure in the at least one of the initial recovery actions; and
 return to using the at least one of the initial recovery actions to which the code load is applied from using the alternate recovery action for the initial recovery action after applying the code load.

15. The system of claim 11, wherein the system includes a first processing unit that accesses a storage through a first device adaptor and a second processing unit that accesses the storage through a second device adaptor, wherein for an error in a path from the first processing unit to the storage, the initial recovery action comprises a failover for the first processing unit to use the second device adaptor and the alternate recovery action comprises a failover from the first processing unit to the second processing unit.

16. A method for performing a recovery action upon detecting an error in a computing system, comprising:
 maintaining an initial recovery table providing initial recovery actions to perform for errors detected in the computing system;
 receiving an alternate recovery table including at least one alternate recovery action for at least one of the initial recovery actions, wherein an alternative recovery action provided for an initial recovery action specifies a different recovery path involving at least one of a different action and a different component in the computing system than involved in the initial recovery action, wherein the initial recovery table and the alternate recovery table are stored in a persistent storage to be maintained through a reboot of the computing system;
 detecting an error in the computing system;
 determining whether to use the initial recovery action in the initial recovery table for the detected error or the alternate recovery action in the alternate recovery table for the initial recovery action; and
 using the initial recovery action or alternate recovery action determined to use to address the detected error.

17. The method of claim 16, further comprising:
 maintaining at least one flag indicating whether to use the initial recovery action in the initial recovery table for the detected error or the alternate recovery action in the alternate recovery table, wherein the determining whether to use the initial or alternate recovery action comprises determining whether the flag indicates to use the initial recovery action or the alternate recovery action.

18. The method of claim 16, wherein each of the at least one alternate recovery action is provided for one of the initial recovery actions when application of the initial recovery action would result in a data integrity or data loss exposure when applied to address the detected error in the computing system.

19. The method of claim 16, further comprising:
 receiving a code load to update code for the at least one of the initial recovery actions for which the at least one alternate recovery action is provided in the alternate recovery table, wherein the code load fixes a data integrity or data loss exposure in the at least one of the initial recovery actions; and
 return to using the at least one of the initial recovery actions to which the code load is applied from using the alternate recovery action for the initial recovery action after applying the code load.

20. The method of claim 16, wherein the computing system includes a first processing unit that accesses a storage through a first device adaptor and a second processing unit that accesses the storage through a second device adaptor, wherein for an error in a path from the first processing unit to the storage, the initial recovery action comprises a failover for the first processing unit to use the second device adaptor and the alternate recovery action comprises a failover from the first processing unit to the second processing unit.

21. A system for accessing a storage, comprising:
 a first processing unit that accesses the storage through a first device adaptor;
 a second processing unit that accesses the storage through a second device adaptor;
 a computer readable storage medium having computer readable program code embodied therein that when executed by one of the first processing unit and the second processing unit performs operations, the operations comprising:

maintaining an initial recovery table providing initial recovery actions to perform for errors detected in the first processing unit and the second processing unit;

receiving an alternate recovery table including at least one alternate recovery action for at least one of the initial recovery actions, wherein an alternative recovery action provided for an initial recovery action specifies a different recovery path involving at least one of a different action and a different component than involved in the initial recovery action;

detecting an error in a defective processing unit comprising one of the first or second processing unit having an error; and determining whether to use the initial recovery action in the initial recovery table comprising a first action with respect to the defective processing unit or the alternate recovery action in the alternate recovery table comprising a second action different from the first action with respect to the defective processing unit; and using the initial recovery action or alternate recovery action determined to use to address the detected error.

22. A method for performing a recovery action upon detecting an error in a computing system, comprising:

maintaining an initial recovery table providing initial recovery actions to perform for errors detected in the computing system including a first processing unit that accesses a storage through a first device adaptor and a second processing unit that accesses the storage through a second device adaptor;

receiving an alternate recovery table including at least one alternate recovery action for at least one of the initial recovery actions, wherein an alternative recovery action provided for an initial recovery action specifies a different recovery path involving at least one of a different action and a different component in the computing system than involved in the initial recovery action;

detecting an error in a defective processing unit comprising one of the first or second processing unit having an error; and determining whether to use the initial recovery action in the initial recovery table comprising a first action with respect to the defective processing unit or the alternate recovery action in the alternate recovery table comprising a second action different from the first action with respect to the defective processing unit; and using the initial recovery action or alternate recovery action determined to use to address the detected error.

* * * * *